UNITED STATES PATENT OFFICE.

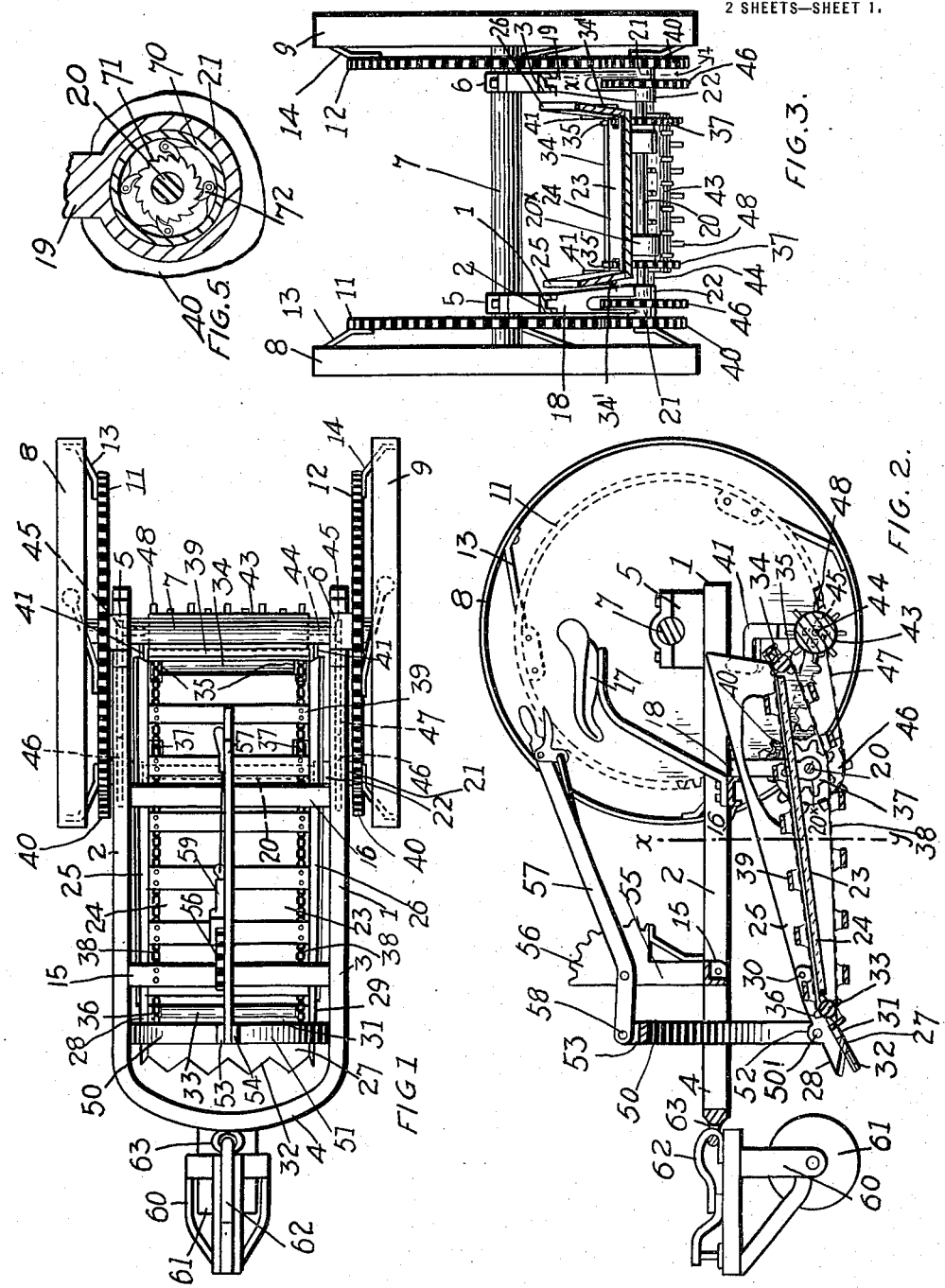

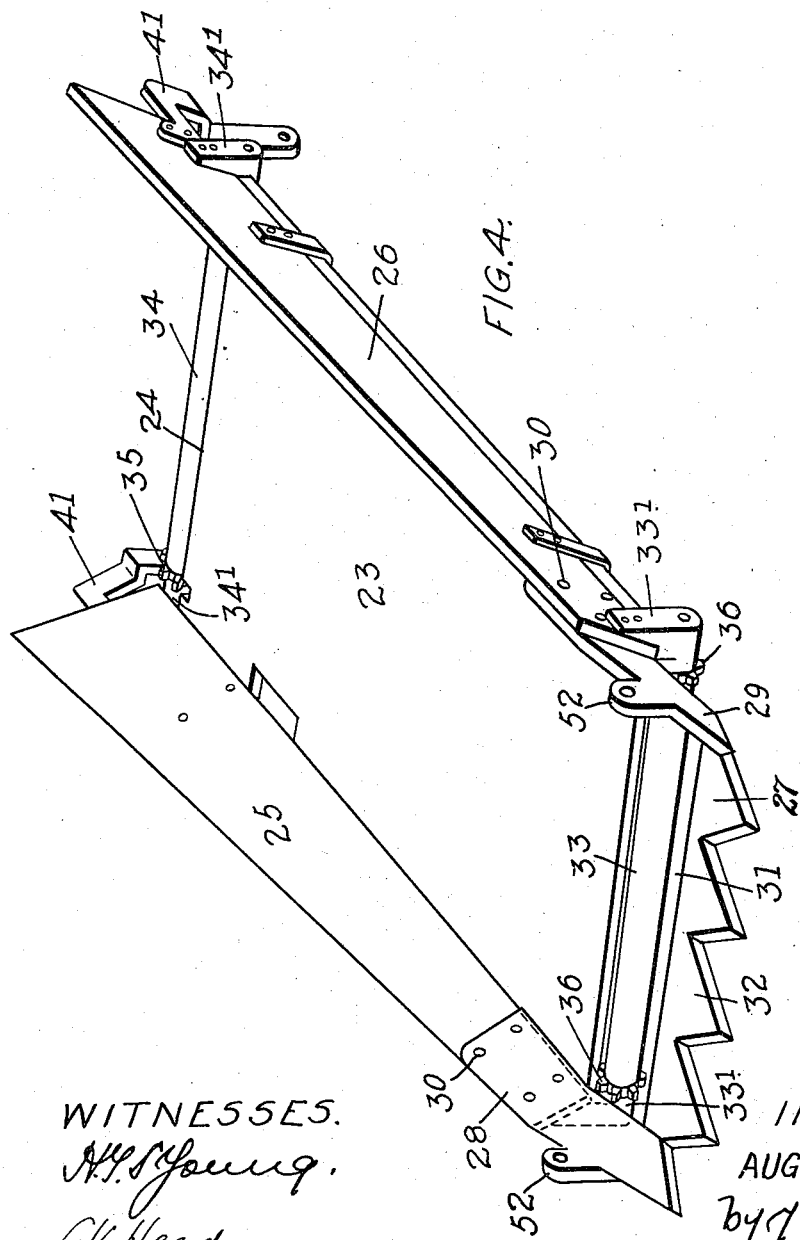

AUGUST HEMME, OF DUBLIN, ONTARIO, CANADA.

WEED-DESTROYING MACHINE.

1,193,015.   Specification of Letters Patent.   Patented Aug. 1, 1916.

Application filed December 12, 1914. Serial No. 876,859.

*To all whom it may concern:*

Be it known that I, AUGUST HEMME, of the village of Dublin, in the county of Huron, in the Province of Ontario, Canada, have invented certain new and useful Improvements in Weed-Destroying Machines, of which the following is the specification.

My invention relates to improvements in weed destroying machines, and the object of the invention is to devise a machine which will lift the top soil, break it up, and redeposit it in a finely broken state on the land so that the weed roots are left exposed to the actions of the sun and it consists essentially of a main frame provided at one end with a supporting axle and carrier wheels mounted on the axle and at the other end with a supporting truck, a scoop swingably supported intermediate of its length from the main frame, cutting blades supported at the forward end of the scoop and forming the forward edge thereof, an endless conveyer designed to travel over the bottom of the scoop, a drum rotatably mounted at the opposite end of the conveyer provided with radial earth breaking arms, means for adjustably supporting the free end of the scoop from the main frame, and means for driving the conveyer and drum from the carrier wheels of the machine as hereinafter more particularly explained by the following specification.

Figure 1, is a plan view of my device with the driver's seat removed in order to more clearly exhibit the construction of my device. Fig. 2, is a longitudinal section through Fig. 1. Fig. 3, is a cross sectional view on line $x$—$y$ Fig. 2, the endless conveyer being removed. Fig. 4, is a perspective detail of the scoop. Fig. 5, is an enlarged sectional detail on line $x'$—$y'$ Fig. 3.

In the drawings like letters of reference indicate corresponding parts in each figure.

1 is the main frame which is substantially U-shaped in form the side arms 2 and 3 extending longitudinally of the machine and the base 4 of the U forming the forward end of the main frame.

5 and 6 are bearing boxes carried upon the rear end of the arms 2 and 3 of the main frame.

7 is an axle extending through the bearing boxes 5 and 6.

8 and 9 are carrier wheels mounted upon the ends of the axle 7 extending to the outside of the main frame.

11 and 12 are the main driving gears carried by the wheels 8 and 9 being secured thereto by the brace bars 13 and 14.

15 is a cross bar extending between the side arms 2 and 3 of the main frame, the ends of the cross bar 15 being suitably secured to the side arms 2 and 3.

16 is a cross bar also extending between the side arms 2 and 3 of the main frame.

17 is the driver's seat which is supported upon the cross bar 16.

18 and 19 are journal brackets depending from the side bars 2 and 3 of the main frame.

20 is a shaft journaled in the brackets 18 and 19. It will be noticed particularly in referring to Fig. 3 that each of the brackets 18 and 19 is provided with a divided bearing end formed by the bearing portions 21 and 22 which are spaced slightly apart for a purpose which will hereinafter appear.

23 is a scoop comprising the bottom board 24, the side boards 25 and 26 and a connecting member 27 comprising side board portions 28 and 29 connected by rivets or bolts 30 to the side boards 25 and 26. The connecting member 27 extends crosswise of the front end of the scoop and slightly spaced therefrom so as to form an intervening slot 31. The forward edge of the connecting member 27 is provided with a series of V-shaped cutting teeth 32.

33 is a roller located in the slot 31 and suitably journaled in bearings 33′ connected to the side board portions 25 and 26 (see Fig. 4).

34 is a similar roller journaled in brackets 34′ connected to the upper ends of the side boards 25 and 26.

35 are sprocket wheels (see Figs. 3 and 4) mounted upon the roller 34 and 36 are similar sprocket wheels mounted upon the roller 33.

37 are sprocket wheels mounted upon the shaft 20.

38 are suitable sprocket chains which pass around the sprocket wheels 35 and 36 above and below the bottom board 24 of the scoop and in mesh with the teeth of the upper and lower peripheral portions of the sprocket wheel 37.

39 are cross slats suitably secured to the sprocket chains 38.

40 are gears mounted upon the shaft 20. The teeth of the gears 40 intermesh with the teeth of the gears 11 and 12. By this means the endless conveyer is driven from the main driving gears 11 and 12 through gears 40, shaft 20, and sprocket wheel 37.

41 are brackets connected to the side boards 25 and 26 as indicated by dotted lines in Fig. 2.

43 is a drum provided with a central shaft 44 journaled in the brackets 41.

45 are sprocket pinions mounted upon the shaft 44.

46 are sprocket gears mounted upon the shaft 20 and 47 are sprocket chains forming a driving connection between the sprocket gears 46 and sprocket pinions 45.

48 are arms extending radially from the drum 43. These arms form beaters which serve to pulverize the earth into fine particles as it is freed from the slats 39 of the endless conveyer. The scoop 23 is swung by brackets 20× on the shaft 20.

It will be readily understood that by my arrangement of drive as described the conveyer provided with slats 39 operates at a comparatively low rate of speed and the drum 43 at a comparatively high rate of speed.

50 and 51 are curved arms forming an arched link. The lower end of each arm is pivotally connected by a bolt 50′ or other suitable means to a lug 52 forming part of the cutting member 27.

53 and 54 are lugs extending upwardly from the link formed by the arms 50 and 51.

55 is a bracket carried by the cross bar 15. The bracket 55 is provided with a quadrant 56.

57 is a lever pivoted intermediate of its length to the bracket 55 and concentric with the center of the quadrant 56. The lower end of the lever 57 extends between the lugs 53 and 54 and is pivoted thereto by a bolt 58. The lever 57 is provided with a spring dog 59 co-acting with the quadrant 56 in the usual way so as to lock the lever in the position to which it has been adjusted.

60 is a truck provided with a truck wheel 61. The truck 60 is connected by a loop connection 62 engaging the eye 63 carried by the front portion of the main frame 1.

In order to allow of difference in motion between the wheels 8 and 9 driving the gear 40 I have provided a hollow hub 70 extending from each gear 40 in which is located a ratchet gear 71 secured to the shaft 20.

72 are spring dogs carried by the hub in engagement with the ratchet, (see Fig. 5).

Having described the principal parts involved in my invention I shall briefly describe the operation of the same. When the machine is brought to the land from which it is desired to eradicate the weeds the operator raises the handle end of the lever 57 so as to lower the forward or cutting edge, the teeth 32 of which engage the ground cutting a slice off from the surface. The slice of earth is lifted by the forward motion of the machine and the earth passed over the cutting members on to the conveyer slats 39 conveying the earth upwardly in a sheet like form throwing it over the rear end of the scoop on to the drum 43 which revolving at a rapid rate of speed breaks the earth by the means of its radial arms 48 into fine particles which are scattered over the surface of the ground to the rear of the machine. The weed roots contained in this sheet of earth are thereby thoroughly separated from the earth and left on the surface of the ground exposed to the action of the sun which quickly kills the weeds.

From this description it will be seen that I have devised a very simple form of machine for destroying weeds. It will be readily understood that in the ordinary method of plowing the land that the weeds turned over with the soil are practically left replanted in the soil and therefore, live until they go to seed and thereby propagate more weeds. By my device the weeds are absolutely destroyed and by treating the ground in this way season after season the weeds are cleaned out of the soil.

What I claim as my invention is.

1. In a weed destroying machine, the combination with the main carriage, of an inclined scoop pivotally supported in a horizontal position by the main carriage and having inclined sides, and a serrated cutting device secured to the forward horizontal edge of the scoop and to the inclined forward edge of the side boards.

2. In a weed destroying machine, the combination with the main carriage, of an inclined scoop pivotally supported in a horizontal position by the main carriage and having inclined sides, a serrated cutting device secured to the forward horizontal edge of the scoop and to the inclined forward edges of the side boards, and a suitably driven endless conveyer traveling over the bottom of the scoop between the rear of the cutting portion and the rear end of the scoop.

AUGUST HEMME.

Witnesses:
 EMILIE VOCK,
 AUGUST BAUER.

Copies of this patent may be obtained for five cents each, by addressing the "Commissioner of Patents, Washington, D. C."